(12) United States Patent
Nishikata et al.

(10) Patent No.: US 8,908,720 B2
(45) Date of Patent: Dec. 9, 2014

(54) DIRECTED-ENERGY IRRADIATING APPARATUS

(71) Applicant: Mitsubishi Heavy Industries, Ltd., Tokyo (JP)

(72) Inventors: Shingo Nishikata, Tokyo (JP); Yuki Uchiyama, Tokyo (JP); Hiroyuki Daigo, Tokyo (JP); Ryuichi Matsuda, Tokyo (JP); Shinya Ishii, Tokyo (JP); Hiroki Uchida, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/908,388

(22) Filed: Jun. 3, 2013

(65) Prior Publication Data

US 2014/0153592 A1 Jun. 5, 2014

(30) Foreign Application Priority Data

Dec. 3, 2012 (JP) ................................. 2012-264769

(51) Int. Cl.
| | |
|---|---|
| *H01S 3/09* | (2006.01) |
| *H05H 7/02* | (2006.01) |
| *H05H 7/04* | (2006.01) |
| *F41H 13/00* | (2006.01) |

(52) U.S. Cl.
CPC ........... *H01S 3/0903* (2013.01); *F41H 13/0043* (2013.01); *F41H 13/005* (2013.01); *F41H 13/0068* (2013.01); *F41H 13/0075* (2013.01); *H05H 7/02* (2013.01); *H05H 7/04* (2013.01); *H05H 2007/022* (2013.01); *H05H 2007/041* (2013.01); *H05H 2007/027* (2013.01)

USPC ............. 372/2; 315/505; 89/1.11; 250/492.1

(58) Field of Classification Search
CPC .......... H01S 3/0903; H05H 7/02; H05H 7/04; F41H 13/0043; F41H 13/005; F41H 13/0068; F41H 13/0075
USPC .............. 250/492.1; 315/505; 372/2; 89/1.11
See application file for complete search history.

(56) References Cited

U.S. PATENT DOCUMENTS

| | | | | |
|---|---|---|---|---|
| 7,166,973 | B1 * | 1/2007 | Douglas et al. | 315/500 |
| 8,661,961 | B2 * | 3/2014 | Rosenberg et al. | 89/1.11 |
| 2002/0011963 | A1 * | 1/2002 | Koslover | 343/781 P |
| 2005/0175042 | A1 * | 8/2005 | Hajima | 372/2 |
| 2011/0316678 | A1 * | 12/2011 | Duge | 340/407.1 |
| 2013/0083880 | A1 * | 4/2013 | Noonan et al. | 376/190 |

FOREIGN PATENT DOCUMENTS

JP 4066330 3/2008

* cited by examiner

*Primary Examiner* — Nicole Ippolito
*Assistant Examiner* — Wyatt Stoffa
(74) *Attorney, Agent, or Firm* — Wenderoth, Lind & Ponack, L.L.P.

(57) ABSTRACT

A directed-energy irradiating apparatus includes an FEL apparatus and an HPM apparatus. The FEL apparatus accelerates free electrons by using a microwave supplied from a microwave source to irradiate an FEL beam and outputs a remaining microwave. The HPM apparatus irradiates an HPM beam generated based on the remaining microwave outputted from the FEL apparatus. It is possible to destroy a target even in a situation that a destruction effect by the FEL beam cannot expected, while maintaining the destruction ability of the FEL beam.

19 Claims, 8 Drawing Sheets

DIRECTED-ENERGY IRRADIATING APPARATUS

CROSS REFERENCE

This application claims a priority on convention based on Japanese Patent Application NO. 2012-264769. The disclosure thereof is incorporated herein by reference.

TECHNICAL FIELD

The present invention relates to a directed-energy irradiating apparatus and more particularly relates to a directed-energy irradiating apparatus that contains a free electron laser apparatus which uses an RF accelerator.

BACKGROUND ART

As a defense system for ships, basic point facilities and the like, a free electron laser (FEL) apparatus has been proposed. The FEL apparatus can destroy a target by collectively irradiating energy to one point in a space by the free electron laser and inactivate an offensive weapon.

Figure 1:
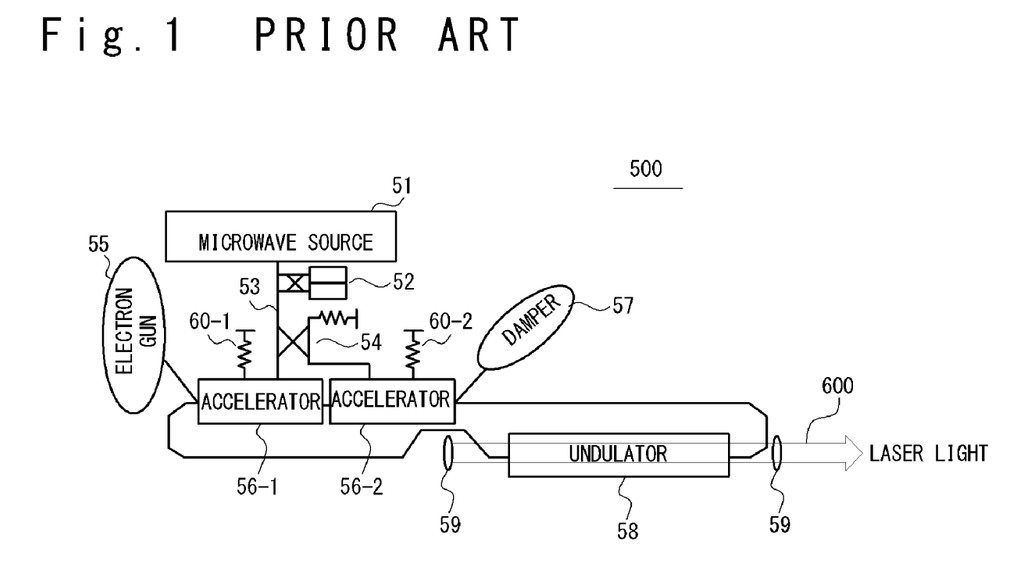
FIG. 1 is a diagram showing a configuration example of a conventional free electron laser apparatus.

FIG. 1 is a diagram showing a configuration example of an FEL apparatus 500 that uses a typical RF accelerator. With reference to FIG. 1, the FEL apparatus 500 contains a microwave source 51, a pulse compressor 52, a waveguide 53, a coupler 54, an electron gun 55, a plurality of accelerators 56-1 and 56-2, a damper 57, an undulator 58 and reflection mirrors 59.

The microwave (RF power) generated by the microwave source 51 is pulse-compressed by the pulse compressor 52 and then supplied through the waveguide 53 and the coupler 54 to each of the accelerators 56-1 and 56-2. The free electrons generated by the electron gun 55 are accelerated close to a light speed by the accelerators 56-1 and 56-2. When the free electrons are passed through the undulator 58, radiation light is generated. Since the radiation light generated through the undulator 58 travels back and forth between the reflection mirrors 59, coherency is improved, and the radiation light is outputted as laser light 600 with a wavelength depending on the energy of the free electrons and the undulator period. It should be noted that the remaining electric power after the electric power is used to accelerate the free electrons is converted into thermal energy in dummy loads 60-1 and 60-2.

Also, Japanese Patent No. 4,066,330 discloses a radiation light generating apparatus that has an energy recovery type pre-accelerator which can be operated in a small RF power (refer to Patent Literature 1). In the radiation light generating apparatus disclosed in Patent Literature 1, the energy recovery type pre-accelerator is arranged on a circular trajectory, and a resonant frequency of an acceleration cavity of the pre-accelerator is slightly detuned from a frequency of the RF power to be used, recover the energy of electron beam. This technique can be applied to the FEL apparatus. Typically, these radiation light generating apparatuses use the RF source for only the acceleration or deceleration of electrons of the beam (electrically charged particles) irrespectively of the electron beam energy recovery.

The free electron laser has a property of going straight and can capture a target in the light speed. Thus, without requiring a conventional ballistic calculation and inducing apparatus by considering external disturbance such as a weather condition, it is possible to increase a hitting precision to a flying object that moves at a high speed. However, when the flying object passes through a region which has influence on a refraction index of the laser light, such as a rain, snow, fog, cloud, or a great temperature difference, the energy density of the laser light is attenuated. Thus, there is a fear that the desirable result cannot be obtained.

CITATION LIST

[Patent Literature 1] Japanese Patent No. 4066330

SUMMARY OF THE INVENTION

From the above, an object of the present invention is to provide a directed-energy irradiating apparatus which can destroy or interfere with a target function even in the situation that a destruction effect by a laser beam cannot be expected, while maintaining the destruction ability of the laser beam.

Another object of the present invention is to provide a directed-energy irradiating apparatus in which the ability of target destruction or interference is improved while restraining an increase quantity of the RF electric power to be introduced, as compared with a conventional FEL apparatus.

The directed-energy irradiation apparatus of the present invention is composed of a microwave source, an FEL (Free Electron Laser) apparatus and an HPM (High Power Microwave) apparatus. The FEL apparatus accelerates free electrons by using the microwave supplied from the microwave source, and irradiates a laser beam generated from the accelerated free electrons. The HPM apparatus irradiates a high output microwave generated based on an excessive RF power of the microwave having been used for the acceleration of the free electrons in the FEL apparatus. In this way, the directed-energy irradiating apparatus of the present invention can irradiate the high output microwave by using the excessive RF power generated in case of irradiation of the laser beam. Thus, both of the laser beam and the high output microwave become able to be irradiated with one microwave source.

It is desirable that the directed-energy irradiating apparatus of the present invention is further composed of a phase synthesizer. Also, it is desirable that the FEL apparatus is composed of a plurality of accelerators. The phase synthesizer synthesizes phases of the excessive RF powers generated from plurality of accelerators. The phase-synthesized excessive RF power is irradiated as a high output microwave after pulse-compression in the HPM apparatus.

It is desirable that the FEL apparatus which affects a present invention is composed of plurality of actuator. It is desirable that HPM apparatus is composed of a plurality of pulse compressors, a plurality of phase control units and a plurality of antenna elements. The excessive RF power generated from the plurality of accelerators is pulse-compressed by the plurality of pulse compressors and is phase-controlled by the plurality of phase control sections, and is irradiated as the high output microwave from the plurality of antenna elements.

According to the present invention, it is possible to destroy a target or stop a target function even in a situation that a destruction effect by a laser beam cannot be expected, while maintaining the destruction ability of the laser beam.

Also, it is possible to improve the ability of target destruction or target function stop while restraining an increase quantity of the RF electric power to be introduced, as compared with a conventional FEL apparatus.

DESCRIPTION OF EMBODIMENTS

Hereinafter, the embodiments of the present invention will be described in detail with reference to the attached drawings. On the drawings, a same or similar reference numeral indicates a same or similar component. When the same components are to be identifiably shown, the description is made by assigning an additional number to the reference number.

[First Embodiment]

Figure 2:
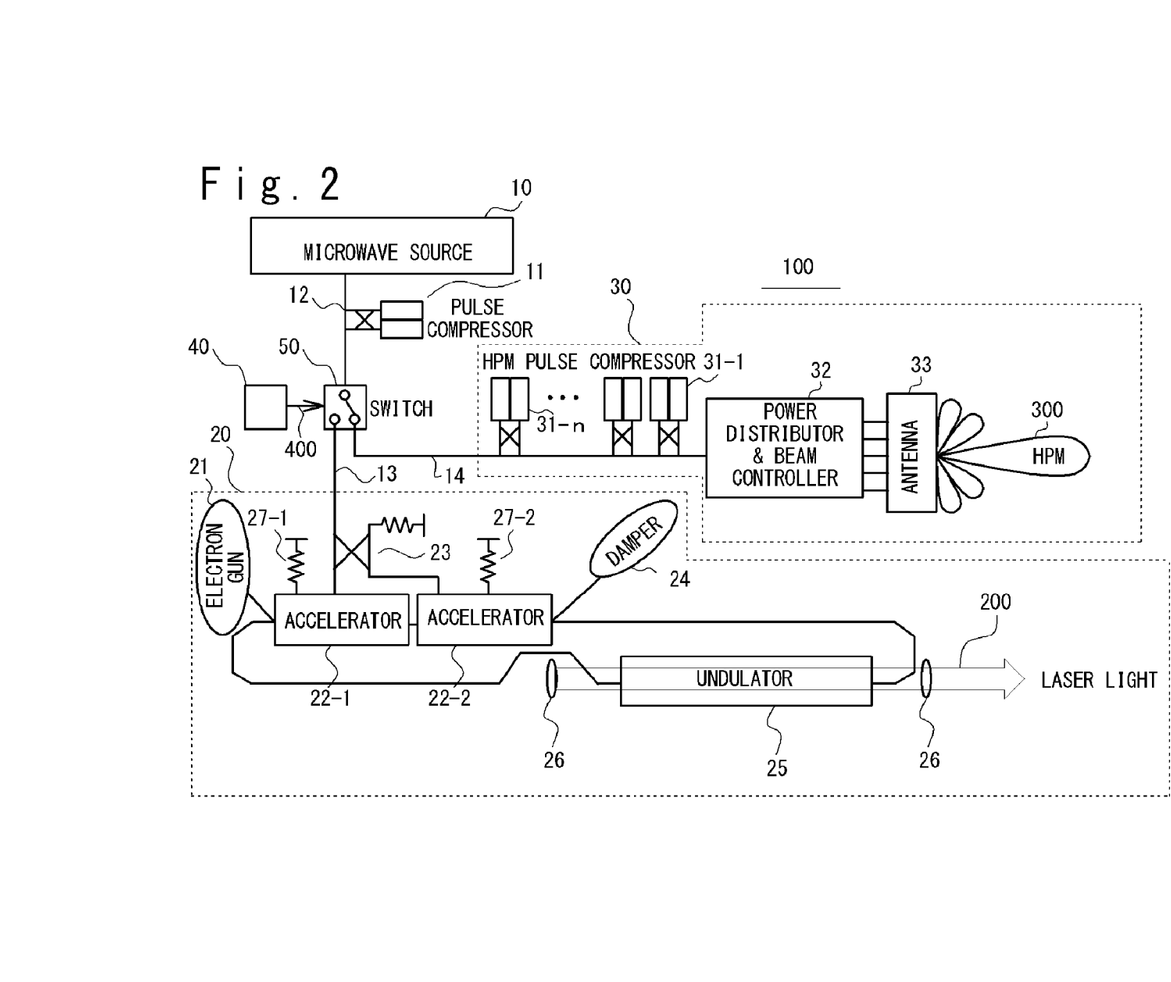
FIG. 2 is a diagram showing a configuration example of a directed-energy irradiating apparatus according to a first embodiment of the present invention.
Figure 3:
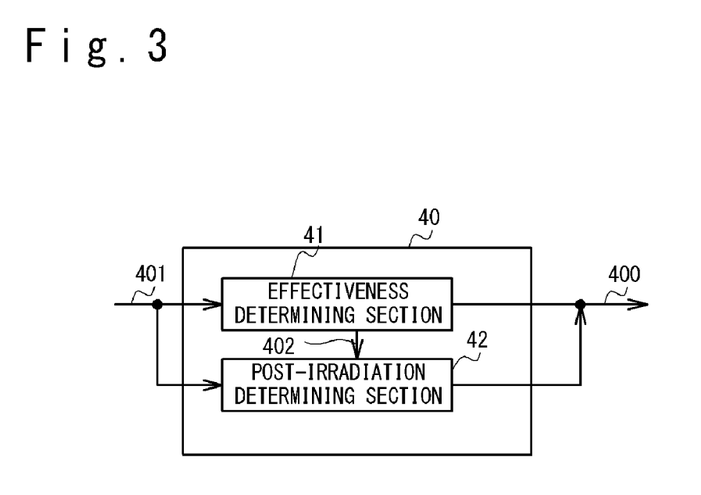
FIG. 3 is a diagram showing a configuration example of a switch controller according to the present invention.
Figure 4:
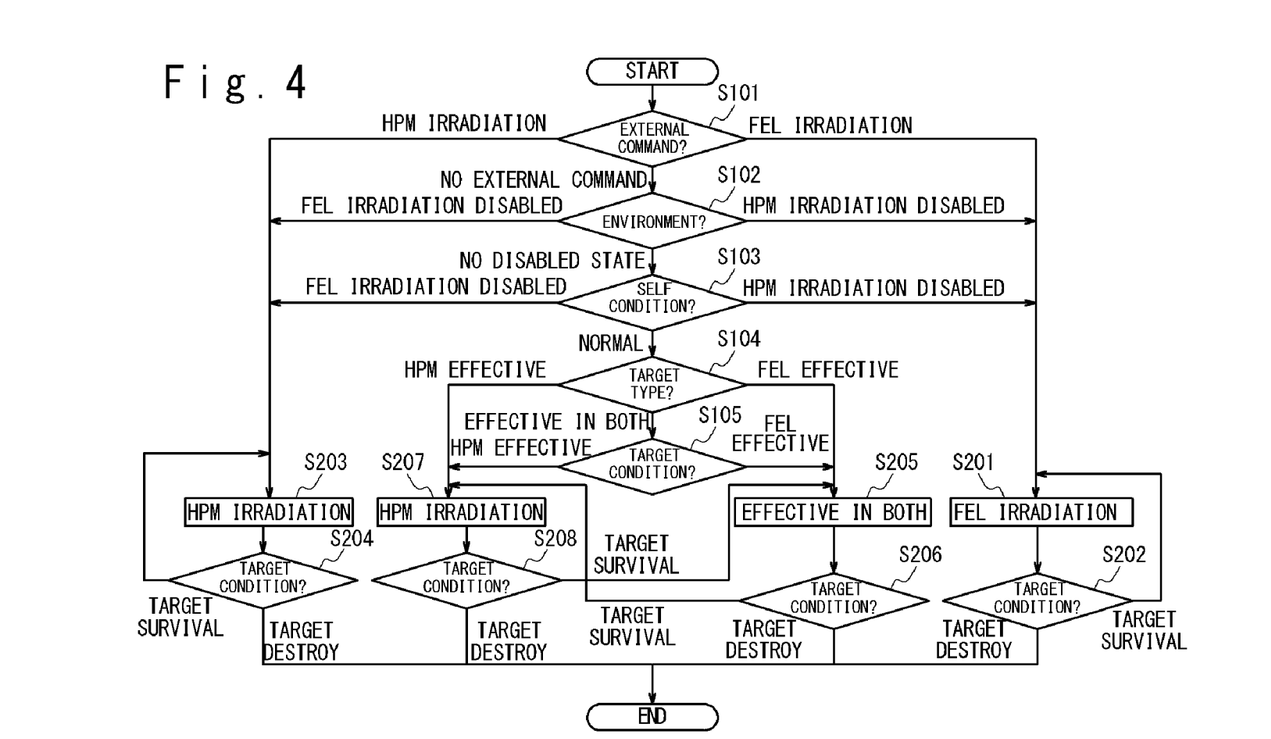
FIG. 4 is a diagram showing an operation example of the directed-energy irradiating apparatus according to the first embodiment of present invention.

With reference to FIGS. 2 to 4, a directed-energy irradiating apparatus 100 according to a first embodiment of the present invention will be described. The directed-energy irradiating apparatus 100 in the first embodiment selects one of a laser beam 200 and a high power microwave (HPM) beam 300 as the directed-energy to be irradiated, by switching an irradiating apparatus serving to be supplied with microwave (RF) power on the basis of external environment or internal environment. Consequently, it is possible to destroy a target with the optimal directed-energy on the basis of the external environment or internal environment. The directed-energy irradiating apparatus 100 in the first embodiment will be described below in detail.

FIG. 2 is a diagram showing a configuration example of the directed-energy irradiating apparatus 100 according to the first embodiment of the present invention. With reference to FIG. 2, the directed-energy irradiating apparatus 100 in the first embodiment contains a microwave source 10, a pulse compressor 11, waveguides 12, 13 and 14, a free electron laser (FEL) apparatus 20, a high power microwave (HPM) apparatus 30, a switch controller 40 and a switch 50.

The microwave source 10 is exemplified by a klystron and outputs microwave (RF power) in a predetermined frequency band (for example, several GHz band). The microwave (RF power) outputted by the microwave source 10 is pulse-compressed by the pulse compressor 11 and supplied through the waveguide 12 to the switch 50. The switch 50 switches the apparatus to be connected to the microwave source 10 (the waveguide 12), in response to a switch control signal 400 from the switch controller 40. The switch 50 according to the present invention is exemplified by an RF switch and connects the microwave source 10 through the waveguide 12 to one of the FEL apparatus 20 through the waveguide 13 and the HPM apparatus 30 through the waveguide 14. The switch 50 can be attained by using either of a semiconductor switch or an electro-mechanical switch. However, it is desirable to use the electro-mechanical switch because an insertion loss is small and a high power transmission can be attained. However, if the high power transmission is possible, the semiconductor switch whose response is fast can be desirably used as the switch 50.

The switch controller 40 outputs the switch control signal 400 on the basis of data indicating the external environment or internal environment, to control the switching operation of the switch 50. FIG. 3 is a diagram showing a configuration example of the switch controller 40 according to the present invention. The switch controller 40 contains an effectiveness determining section 41 and a post-irradiation determining section 42. The effectiveness determining section 41 and the post-irradiation determining section 42 are desirably attained by a processor (not shown) executing a program recorded in a storage unit (not shown).

The effectiveness determining section 41 determines an effective destroying method of targets on the basis of status data 401 supplied from sensors or an input unit (interface) that are not shown, and outputs the switch control signal 400 based on a determination result. If determining that the laser beam 200 (FEL beam 200) is effective for the target destruction, or if determining that the HPM apparatus 30 cannot be used, the effectiveness determining section 41 outputs the switch control signal 400 on the basis of the status data 401 to select the FEL apparatus 20. Also, if determining that the high power microwave beam 300 (HPM beam 300) is effective for the target destruction, or if determining that the FEL apparatus 20 cannot be used, the effectiveness determining section 41 outputs the switch control signal 400 on the basis of the status data 401 to select the HPM apparatus 30.

Here, the status data 401 are desirable to include at least one of command data specifying the destroying method, apparatus operation data indicating a state (operation enable or disable state) of each of the FEL apparatus 20 and the HPM apparatus 30, environmental data in a periphery of the directed-energy irradiating apparatus 100, and target data indicating a state and a type of each target. Specifically, the command data are data to specify one of FEL beam and HPM beam for the destroying method. The command data may be supplied manually through the input unit or may be automatically supplied through the interface from an external unit. The apparatus operation data are data indicating a current operation state of the irradiating apparatus and outputted from sensors (not shown) provided for the FEL apparatus 20 and the HPM apparatus 30. The apparatus operation data may be parameters (for example, a voltage, a current, a temperature, a frequency and so on) indicating the operation state detected by the sensors (not shown), or may be data indicating an operation enable or disable state and a self-diagnosis result (existence or non-existence of a failure and performance degradation) of the FEL apparatus 20 and the HPM apparatus 30, which are derived on the basis of an analysis result of the parameters detected by the sensors. The environmental data include at least one of weather data (a rainfall amount, a snow amount, fog, wind force, a wind direction, a temperature, a humidity and so on) around the directed-energy irradiating apparatus 100, and geographical data (a height, peripheral environment (a mountainous area, a seaside area, a riverside area, vegetation and sea surface reflection)), and a non-target data (kinds, positions, speeds, movement directions, and counts of artificial materials other than the targets). In the environmental data, the geographical data are desirable to be recorded in advance in a storage unit (not shown). The other environmental data can be detected by a monitoring unit (not shown) (for example, various types of weather monitoring units, an identification friend or foe unit, a radar and so on). The target data include at least one of a target type, a surface temperature distribution of the target, a beam spread on the target, a movement direction of the target, a speed of the target, a target position (the relative positions of the targets), the number of targets, and a presence or absence of a falsity. The target data can be obtained by using the monitoring unit (not shown) (for example, a radar unit, a temperature sensor, an infrared sensor and so on).

The effectiveness determining section 41 notifies irradiation state data 402 indicating the irradiation apparatus on the irradiation, to the post-irradiation determining section 42. The irradiation state data 402 includes data indicating whether the FEL beam or HPM beam is being irradiated to each target, and data specifying the irradiating apparatus to be used. The post-irradiation determining section 42 determines whether the FEL beam or HPM beam is currently being irradiated to the target, on the basis of the irradiation state data 402, and specifies the irradiating apparatus being used.

The post-irradiation determining section 42 determines a target destruction effect on the basis of the status data 401 and the irradiation state data 402 during the irradiation of the FEL beam or HPM beam, and outputs the switch control signal 400 based on the determination result. The post-irradiation determining section 42 is desirable to determine the effect of the FEL beam or HPM beam that is being irradiated, on the basis of the status data 401, especially, the target data, and determine the irradiating apparatus on the basis of the determination result. If determining that there is not any target destruction effect through the FEL beam which is being irradiated, the post-irradiation determining section 42 outputs the switch control signal 400 to select the HPM apparatus 30. Also, if determining that there is not any target destruction effect through the HPM beam which is being irradiated, the post-irradiation determining section 42 outputs the switch control signal 400 to select the FEL apparatus 20.

The irradiation state data 402 may include data to specify an unusable apparatus of the FEL apparatus 20 and HPM apparatus 30. If one of the FEL apparatus 20 and the HPM apparatus 30 cannot be used, the post-irradiation determining section 42 does not determine the destroying method based on the irradiation state data 402, and outputs the switch control signal 400 to select a usable apparatus.

With reference to FIG. 2, the FEL apparatus 20 contains waveguide 13, a coupler 23, an electron gun 21, a plurality of accelerators 22-1 and 22-2, a damper 24, an undulator 25 and reflection mirrors 26. The microwave (RF power) is supplied through the switch 50, the waveguide 13, and the coupler 23 to each of the accelerators 22-1 and 22-2. Free electrons generated by the electron gun 21 are accelerated by the accelerators 22 (22-1 and 22-2) to a speed close to the speed of light, and the accelerator is exemplified by a disc-loaded accelerator. When the free electrons are passed through the undulator 25, radiation light is generated. The radiation light generated by the undulator 25 travels between the reflection mirrors 26 to improve coherency, and then, is outputted as the laser beam 200 (FEL beam 200) with the wavelength (for example, IR band) determined based on the energy of the free electrons and the undulator period. It should be noted that the remaining power that is not used to accelerate the free electrons may be recovered by the accelerators 22 and again used, or may be converted into thermal energy by dummy loads 27-1 and 27-2. Also, the number of accelerators 22 is not limited to the above. Naturally, the number can be arbitrarily determined.

The HPM apparatus 30 contains the waveguide 14, HPM pulse compressors 31-1 to 31-$n$ ($n$ is an integer of 1 or more) connected to the waveguide 14, and a power distributor & beam controller 32 and an antenna 33. The microwave (RF power) is supplied through the switch 50 to the waveguide 14, is compressed by the HPM pulse compressors 31-1 to 31-$n$, and is supplied to the power distributor & beam controller 32. The power distributor & beam controller 32 power-distributes the microwave to the antenna 33 exemplified by an array antenna. The antenna 33 outputs the distributed microwave as the high power microwave (HPM) beam 300. At this time, the irradiation direction of the HPM beam 300 is determined by the beam controller of the power distributor & beam controller 32.

When the FEL beam 200 is radiated to each target or the vicinity of the target, the target can be physically destroyed through the temperature increase of the target surface or an ionization effect on the target surface. On the other hand, when the HPM beam 300 is irradiated to each target, high current is generated in an electronic circuit installed in an artificial material (a flying object, a ship or facilities) as the target through electro-magnetic induction, so that the electronic circuit can be destroyed. Consequently, the function of the artificial material can be lost.

Through the above configuration, the directed-energy irradiating apparatus 100 according to the present invention can select one of the physical destruction with the laser beam 200 and the functional destruction with the HPM beam 300. At this time, the directed-energy irradiating apparatus 100 in the first embodiment selects one of the laser beam 200 and the HPM beam 300, as the destroying method effective for the target destruction, on the basis of the external environment such as the weather condition and the target status, and the internal environment such as the apparatus operation data. For example, when the effect to be expected with the laser beam 200 cannot be attained due to the weather condition (for example, the arrival distance of the laser beam 200 becomes short due to rain, snow, fog or the like), the HPM beam 300 can be used to destroy the target, because it is not easily affected by the weather condition. On the other hand, when the target is located at a position where damage is assumed due to crash as the result of an uncontrollable state, or when an electro-magnetic shielding performance of the target is high, the laser beam 200 can be used to physically destroy the target such as a flying object.

Referring to FIG. 4, an operation example of the directed-energy irradiating apparatus 100 in the first embodiment will be described below. FIG. 4 is a flowchart showing a switching determination operation example of the directed-energy irradiating apparatus 100 in the first embodiment.

Here, a selecting algorithm of using one of the FEL apparatus 20 and the HPM apparatus 30 and destroying the target is shown. At first, the switch controller 40 determines whether or not the status data 401 includes command data (external command) (Step S101). Here, if the external command of the FEL beam irradiation is included as the command data, the switch controller 40 outputs the switch control signal 400 to select the FEL apparatus 20. Consequently, the microwave source 10 and the FEL apparatus 20 are connected by the switch 50, and the FEL beam 200 is irradiated from the FEL apparatus 20 to the targets (Step S201). After the irradiation of the FEL beam 200, the irradiation effect is checked at a predetermined timing (Step S202). Here, the target status is checked. The check of the effect may be carried out after the predetermined number of times of the irradiation of the FEL beam 200 or may be carried out periodically or may be carried out at an optional timing. The timing of step S206 to be described later is also similar. If the target is determined to be in the survival state at the step S202, the FEL beam 200 is irradiated in succession. If the target is determined to be destroyed (obliterated), the processing is ended.

On the other hand, if the external command of the HPM irradiation is included as the command data at the step S101, the switch controller 40 outputs the switch control signal 400 to select the HPM apparatus 30. Consequently, the microwave source 10 and the HPM apparatus 30 are connected by the switch 50, and the HPM beam 300 is irradiated from the HPM apparatus 30 to the target (Step S203). After the irradiation of the HPM beam 300, the irradiation effect is checked at a predetermined timing (Step S204). Here, the status of the target is checked. The check of the effect may be carried out after the predetermined number of times of the irradiation of the HPM beam 300 or may be carried out periodically or carried out at an optional timing. The timing of a step S208 described later is also similar. If the target is determined to be in the survival state at the step S204, the HPM beam 300 is irradiated in succession. If the target is determined to be destroyed (obliterated), the processing is ended.

If the status data 401 does not include the command data (external command) (if the irradiating apparatus is not specified) at the step S101, the switch controller 40 determines that the apparatus is in an irradiation disabled state, on the basis of the environmental data of the status data 401 (Step S102). As the determining method at the step S102, for example, there are (1) a method of determining the irradiation enabled or disabled state based on the irradiation area in each of the FEL beam 200 and the HPM beam 300, and (2) a method of determining the irradiation enabled or disabled state based on the weather condition and weather forecast.

In the (1) determining method, it is determined whether or not there are artificial materials (for example, friends, a civil airplane, a civil ship and civil facilities and the like) other than the targets in the irradiation area of each of the FEL beam 200 and the HPM beam 300, and when the above artificial materials exist, the apparatus in the irradiation disabled state is determined on the basis of the positions and the number of the artificial materials. For example, if the number of the artificial materials other than the targets in the irradiation area is greater than a predetermined value (a threshold value including 0), the irradiating apparatus corresponding to the irradiation area is determined as the irradiation disabled apparatus. Here, as a threshold value of the number of the artificial materials other than the targets used in the determination, the different values may be set for the FEL beam 200 and the HPM beam 300. Because the irradiation area of the HPM beam 300 is wider than that of the FEL beam 200, there is a case that the HPM apparatus 30 is determined to be the irradiation disabled apparatus, and the FEL apparatus 20 is determined to be the irradiation enabled apparatus, even in the irradiation to the same targets. That is, the FEL beam 200 can be primarily used for the region where the many artificial materials other than the targets exist. When the irradiation enabled or disabled state is determined on the basis of the irradiation area, the irradiation area in case of the irradiation to the target is desirable to be calculated. At this time, it is desirable that the irradiation area is modified on the basis of the influence of sea surface reflection, and the irradiation enabled or disabled state is determined on the basis of the modified irradiation area. For example, when the HPM beam 300 is irradiated to the vicinity of the sea surface, the irradiation area is changed due to the influence of the sea surface reflection. For this reason, it is effective to calculate the irradiation area for determination of the irradiation disabled apparatus, by considering geographical data.

In the (2) determining method, for example, in case of rain, snow and fog, the FEL apparatus 20 may be determined to be the irradiation disabled apparatus. At this time, the irradiation disabled apparatus may be determined on the basis of the weather condition forecasted in accordance with the geographical data. For example, the generation of rain, snow, cloud or fog may be forecasted in accordance with parameters influencing on the weather such as a mountain zone and a seacoast zone, and the irradiation enabled or disabled state may be determined on the basis of the forecasted result.

When determining that the HPM beam irradiation is disabled at the step S102, the switch controller 40 outputs the switch control signal 400 to select the FEL apparatus 20. Consequently, the microwave source 10 and the FEL apparatus 20 are connected by the switch 50, and the FEL beam 200 is irradiated from the FEL apparatus 20 to the targets (Step S201). After the irradiation of the FEL beam 200, the operational flow proceeds to the step S202, similarly to the above.

On the other hand, when determining that the FEL irradiation is disabled at the step S102, the switch controller 40 outputs the switch control signal 400 to select the HPM apparatus 30. Consequently, the microwave source 10 and the HPM apparatus 30 are connected by the switch 50, and the HPM beam 300 is irradiated from the HPM apparatus 30 to each of the targets (Step S203). After the irradiation of the HPM beam 300, the operational flow proceeds to the step S204, similarly to the above.

If there is not the irradiating apparatus determined to be the irradiation disabled apparatus at the step S102, the switch controller 40 determines the irradiation disabled apparatus on the basis of the apparatus operation data of the status data 401 (Step S103). Here, the switch controller 40 specifies the irradiating apparatus that is not in a normal operation (failure, performance down and the like) and the irradiating apparatus that is in the normal operation, on the basis of the apparatus operation data. At this time, if the FEL apparatus 20 is determined to be in the normal operation and the HPM apparatus 30 is determined to be not in the normal operation (i.e. if only the HPM beam 300 is determined as the irradiation disabled apparatus), the operation flow proceeds to the steps S201 and S202, similarly to the above. On the other hand, if the HPM apparatus 30 is determined to be in the normal operation and the FEL apparatus 20 is determined to be not in the normal operation (if only the FEL beam 200 is determined as the irradiation disabled apparatus), the operation flow proceeds to the steps S203 and S204, similarly to the above.

If there is not the irradiating apparatus determined to be the irradiation disabled apparatus at the step S103, the switch controller 40 specifies the irradiating apparatus effective for the target destruction, on the basis of the target data of the status data 401 (Steps S104 and S105). Here, the irradiating apparatus whose target destruction effect is high is primarily selected on the basis of the target type data of the target data (Step S104). In detail, the switch controller 40 specifies the platform type or specific type of each target (for example, an airplane, a missile, a ship and a vehicle) and the model from the target type data and selects the irradiating apparatus whose target destruction effect is high for this. At this time, as the target type data, the identification data notified from a target identifying apparatus or an external unit is preferably used. The switch controller 40 specifies the target type and the like, checks and confirms the target properties such as the thickness of a structure of the target, presence or absence of electric and electronic components, electro-magnetic shielding performance, presence or absence of an anti-lazar mirror and the like, and selects the irradiating apparatus whose target destruction effect is high, on the basis of those target properties. For example, when the thickness of the structure of the target is equal to or higher than a predetermined value set on the basis of each of the materials of the structure, or when the anti-lazar mirror is equipped in each target, the HPM beam 300 is determined to be more effective than the FEL beam 200. Or, when the electric or electronic components are not installed in the target, or when the electro-magnetic shielding performance of the target is equal to or higher than a predetermined performance, the FEL beam 200 is determined to be more effective than the HPM beam 300. However, when it is difficult to determine the superiority or inferiority of the irradiating apparatus because of a combination of the target properties, a determination that both are effective is preferable.

At the step S104, when determining that the FEL beam irradiation is effective, the switch controller 40 outputs the switch control signal 400 to select the FEL apparatus 20. Consequently, the microwave source 10 and the FEL apparatus 20 are connected by the switch 50, and the FEL beam 200 is irradiated from the FEL apparatus 20 to the target (Step S205). After the irradiation of the FEL beam 200, the irradiation effect is checked at a predetermined timing (Step S206). If the target is determined to be in the engagement status at the step S206, it is switched to the irradiation of the HPM beam 300 (Step S207). If the target is determined to have been destroyed (obliterated), the process is ended.

On the other hand, when determining that the FEL beam irradiation is effective at the step S104, the switch controller 40 outputs the switch control signal 400 to select the HPM beam 300. Consequently, the microwave source 10 and the HPM apparatus 30 are connected by the switch 50, and the HPM beam 300 is irradiated from the HPM apparatus 30 to the targets (Step S207). After the irradiation of the HPM beam 300, the irradiation effect is checked at a predetermined timing (Step S208). Here, the status of each target is checked. If the target is determined to be in the engagement status at the step S208, the irradiating apparatus is switched to the FEL apparatus (Step S205). If the target is determined to be destroyed (obliterated), the process is ended.

If the superiority or inferiority of the irradiating apparatus cannot be determined on the basis of the target properties of the target type at the step S104, the switch controller 40 selects the irradiating apparatus whose target destruction effect is high, in accordance with the data indicating the target status, of the target data of the status data 401 (Step S105). As the determining method at the step S105, for example, there are a (3) method of determining the superiority or inferiority based on a handling time, a (4) method of determining the superiority or inferiority based on the number of the targets and the target positions (the relative positions of the targets), and a (5) method of determining the superiority or inferiority based on presence or absence of a deceiving scheme of the target and its kind.

In the (3) determining method, if a target speed is equal to or higher than a predetermined value, the HPM beam 300 is determined to be more effective than the FEL beam 200 because the handling time necessary for the target destruction is short. If the speed is lower than the predetermined value, the irradiating method that is determined to be more effective than the other determining methods is primarily used. In particular, the speed of a cross range direction is equal to or higher than a predetermined value, the HPM beam 300 is determined to be effective. If the speed of the cross range direction is equal to or higher than the predetermined value, the target can be determined to have been equipped with an escaping action. Thus, the predetermined value is desirable to be set to the low speed, as compared with the predetermined value of the speed other than the cross range direction.

In the (4) determining method, if the number of targets to be handled is greater than a handling possible number (predetermined value) in the FEL beam 200, the HPM beam 300 is determined to be effective because a wide range handling can be carried out in a short time. If the above number is smaller than the predetermined value, the irradiating method which is determined to be more effective than the other methods is primarily used. Or, if the targets are positioned to be further from the directed-energy irradiating apparatus 100 than a predetermined distance, the HPM beam 300 whose irradiation effect reaches the faraway location is determined to be effective. If the distance to the above target position is shorter than the predetermined distance, the irradiating method that is determined to be more effective than the other determining methods is primarily used. Moreover, the irradiating method may be selected on the basis of the the relative positions of the targets to be handled. For example, if the targets are distributed in a range wider than a predetermined range, the HPM beam 300 that can enable the wide range handling in the short time is determined to be effective. If the targets are arranged in a range narrower than the predetermined range, the irradiating method that is determined to be more effective than the other determining methods is primarily used.

In the (5) determining method, if the deceiving means of a target periphery is detected, the irradiating apparatus is selected that is effective for a type of the deceiving means, the deceiving range and the like. Here, the deceiving means is detected on the basis of the data obtained from a radar, an infrared camera and the like, which are not shown. For example, there are chaff, flare, smoke and the like as the deceive means. For example, if the smoke exists between the directed-energy irradiating apparatus 100 and each target, the HPM beam 300 can be determined to be effective. If the chaff exists, the FEL beam 200 can be determined to be effective. Also, if the flare exists, the HPM beam 300 whose irradiation area is wide is preferably determined to be effective.

Specific examples of the determining operations of the target status at the steps S202, S204, S206 and S208 will be described below. Here, the destruction effect after the irradiation of the FEL beam 200 or HPM beam 300 is determined.

At first, the determining operation of the destruction effect after the FEL beam 200 is irradiated to the target will be described. As the determination of the destruction effect by the FEL beam 200, for example, there are a (6) determining method based on a target surface temperature distribution, a (7) determining method based on a beam spread, and a (8) determining method based on a laser reflection intensity.

In the (6) determining method, if the temperature change (temperature increase) of the target before and after the irradiation of the FEL beam 200 is equal to or lower than a predetermined value, there is not any temperature increase effect by the FEL beam 200. Thus, the target is determined to be in the engagement status. It is desirable that the change of a temperature distribution on the target surface is observed by using the infrared camera, and the temperature increase effect is determined on the basis of the predetermined value in which the weather and the material and paint application of the target surface are considered.

In the (7) determining method, if the beam spread in the target periphery during the irradiation of the FEL beam 200 is equal to or higher than a predetermined value, it is determined that there is not any destruction effect by the FEL beam 200. Thus, the target is determined to be in the engagement status. Depending on the states of the weather and atmosphere, there is a case that the beam spread exceeds a predicted area. Therefore, it is effective to observe the beam spread.

In the (8) determining method, if a laser cross section calculated on the basis of the reflection intensity of the FEL beam 200 is equal to or higher than the predetermined value, there is not any destruction effect by the FEL beam 200. Thus, each target is determined to be in the engagement status. If the laser cross section is lower than the predetermined value, it is determined that there is any destruction effect by the FEL beam 200.

The determining operation of the destruction effect after the FEL beam 200 or HPM beam 300 is irradiated to the target will be described below. As the determining methods of the destruction effect by the FEL beam 200 or HPM beam 300, for example, there are a (9) determining method based on a relative speed of the target before and after the irradiation, a (10) determining method based on a change in the movement state of the target before and after the irradiation, and a (11) determining method based on the engagement status of the targets after the irradiation.

In the (9) determining method, if the relative speed of the target after the irradiation of the FEL beam 200 or HPM beam 300 is equal to or higher than a predetermined value, there is not any destruction effect through the irradiation. Thus, the target is determined to be in the engagement status. If the relative speed of the target after the irradiation of the FEL beam 200 or HPM beam 300 is lower than the predetermined value, it is determined that there is any destruction effect through the irradiation. Thus, the target is determined to be destroyed.

In the (10) determining method, if a change amount (for example, a drop amount) of the relative speed to the target before and after the irradiation of the FEL beam 200 or HPM beam 300 is equal to or higher than a predetermined value, it is determined that there is not any destruction effect through the irradiation. Thus, the target is determined to be in the engagement status. If the change amount of the relative speed to the target is lower than the predetermined value, it is determined that there is any destruction effect through the irradiation. Thus, the target is determined to be destroyed.

The engagement status of the target is data indicating whether or not the target to which the directed-energy is irradiated is in the engagement status. For example, the survival status can be detected by a search radar apparatus. In the (11) determining method, whether or not the target after the irradiation of the FEL beam 200 or HPM beam 300 is in the engagement status is determined from the engagement status based on the search result by the searching radar.

The determining methods in the above (7) to (11) may be carried out at the step S105. In this case, prior to the effect determination, the FEL beam 200 or HPM beam 300 is tried to be irradiated. Also, the irradiating apparatus to be tried is desirable to be determined in advance. The FEL beam 200 is preferably tried to be irradiated in view of the content of the effect determination.

As mentioned above, according to the directed-energy irradiating apparatus 100 in the first embodiment, the FEL apparatus 20 and the HPM apparatus 30 are separately used on the basis of the targets and the environment. Thus, the target destruction performance is improved. For example, the irradiation beam (the directed-energy) whose destruction effect is high can be selected on the basis of the target type, the weather and the irradiation effect, thereby improving the handling performance. In particular, the targets can be destroyed, even under a situation in which the destruction effect by the laser beam cannot be expected. Also, while suppressing the influence on the artificial materials (the moving body) other than the targets around the targets, it is possible to selectively destroy the targets.

Moreover, since the switch 50 can be used to switch the supply destination of the microwave (RF power), the common microwave source 10 can be used for the FEL beam irradiation or HPM beam irradiation. That is, for the sake of the FEL beam irradiation or HPM beam irradiation, the preparation of a plurality of microwave sources are not required, which can attain the reduction in electric power consumption and the reduction in a system size.

[Second Embodiment]

Figure 5:
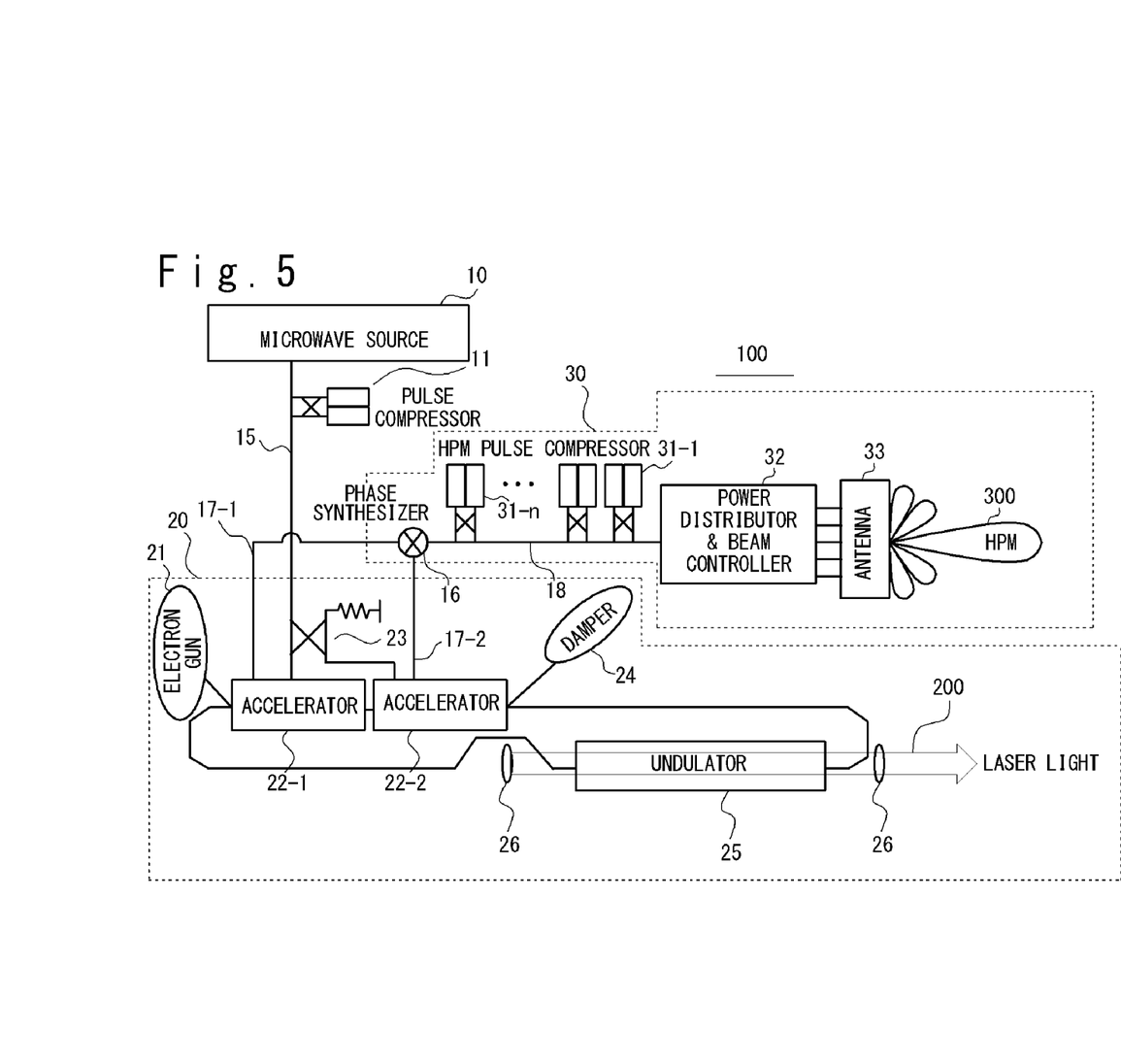
FIG. 5 is a diagram showing an example of a configuration in the directed-energy irradiating apparatus according to a second embodiment of the present invention.

With reference to FIG. 5, the directed-energy irradiating apparatus 100 according to a second embodiment of the present invention will be described. The directed-energy irradiating apparatus 100 in the second embodiment outputs the HPM beam 300 by using excessive RF power that is generated when the FEL beam 200 is irradiated. Consequently, the common microwave source 10 can be used to irradiate the FEL beam 200 and the HPM beam 300 simultaneously or individually. In particular, even under the situation in which the destruction effect by the laser beam cannot be expected, the targets can be destroyed. The directed-energy irradiating apparatus 100 in the second embodiment will be described below in detail.

FIG. 5 is a diagram showing a configuration example of the directed-energy irradiating apparatus 100 according to the second embodiment of the present invention. With reference to FIG. 5, the directed-energy irradiating apparatus 100 in the second embodiment contains the microwave source 10, the pulse compressor 11, waveguides 15, 17-1, and 17-2, the FEL apparatus 20, and the HPM apparatus 30 including a phase synthesizer 16. It should be noted that the pulse compressor 11 may be omitted.

The microwave source 10 is exemplified as the klystron and outputs the microwave (RF power) of the predetermined frequency band (for example, several GHz). The microwave (RF power) outputted by the microwave source 10 is pulse-compressed by the pulse compressor 11 and is supplied through the waveguide 15 to the FEL apparatus 20. The number of the microwave sources 10 can be arbitrarily set. Thus, the number may be one or plural.

The FEL apparatus 20 contains a coupler 23, the electron gun 21, the plurality of accelerators 22-1 and 22-2, the damper 24, the undulator 25 and the reflection mirrors 26. The microwave (RF power) is supplied through the waveguide 15 and the coupler 23 to each of the accelerators 22-1 and 22-2. The free electrons generated by the electron gun 21 are accelerated by the accelerators 22-1 and 22-2 to a speed close to the light speed and the accelerator is exemplified as a disc loaded accelerator. When the free electrons are passed through the undulator 25, radiation light is generated. The radiation light generated by the undulator 25 travels back and forth between the reflection mirrors 26 to improve the coherency. The radiation light is outputted as the FEL beam 200 determined in accordance with the energy of the free electrons and the wavelength (for example, IR band) for the undulator period. In this embodiment, of the microwave (RF power) supplied from the microwave source, the excessive RF power that is not used to accelerate the free electrons is supplied to the phase synthesizer 16 through the waveguides 17-1 and 17-2 and not the dummy loads. For example, when the microwave of several megawatts is supplied from the microwave source 10, the excessive RF power of several gigawatts that has the harmonic wave having a frequency equal to integer times of that of the basic wave is generated in addition to the basic wave having the same frequency as the microwave. It should be noted that when a plurality of microwave sources 10 are installed, a plurality of couplers 23, accelerators 22 and waveguides 15 are naturally installed.

The accelerator 22 is a linear accelerator of an energy recovery type and is exemplified by an accelerator (an RF cavity) of a disc loaded acceleration structure which has a plurality of acceleration cavities between discs. A beam load through which a beam of the free electrons is passed is formed in the disc. As the accelerator 22, it is possible to use, for example, one of an attenuation type cavity, a detuning type cavity and a chalk type cavity. The microwave (RF power) that is supplied through the coupler 23 from one of the ends of the accelerator 22 in this embodiment is propagated through the accelerators 22 and outputted to the waveguide 17 through a coupler (that is not shown) connected to the other end. At this time, the microwave is used to accelerate the free electrons in the accelerators 22, and the remaining excessive RF power is outputted to the waveguides 17. If the free electrons are not supplied, the FEL beam 200 is not generated and the energy supplied from the microwave source 10 is almost supplied to the HPM apparatus 30.

The HPM apparatus 30 contains the phase synthesizer 16, a waveguide 18, pulse compressors 31-1 to 31-$n$ (n is an integer of 2 or more) connected to the waveguide 18, and a power distributor & beam controller 32 and an antenna 33. The phase synthesizer 16 synthesizes the phases of the excessive RF powers outputted from the plurality of accelerators 22-1 and 22-2 to outputs to the waveguide 18. The microwave (excessive RF power) supplied to the waveguide 18 is compressed by the HPM pulse compressors 31-1 to 31-$n$ and supplied to the power distributor & beam controller 32. The power distributor & beam controller 32 distributes in the form of the electric power, the microwave to the antenna 33 exemplified as an array antenna. The antenna 33 outputs the distributed microwave as the high power microwave beam 300 (HPM beam 300). At this time, the irradiation direction of the HPM beam 300 is determined under the beam control by the power distributor & beam controller 32.

Figure 7:
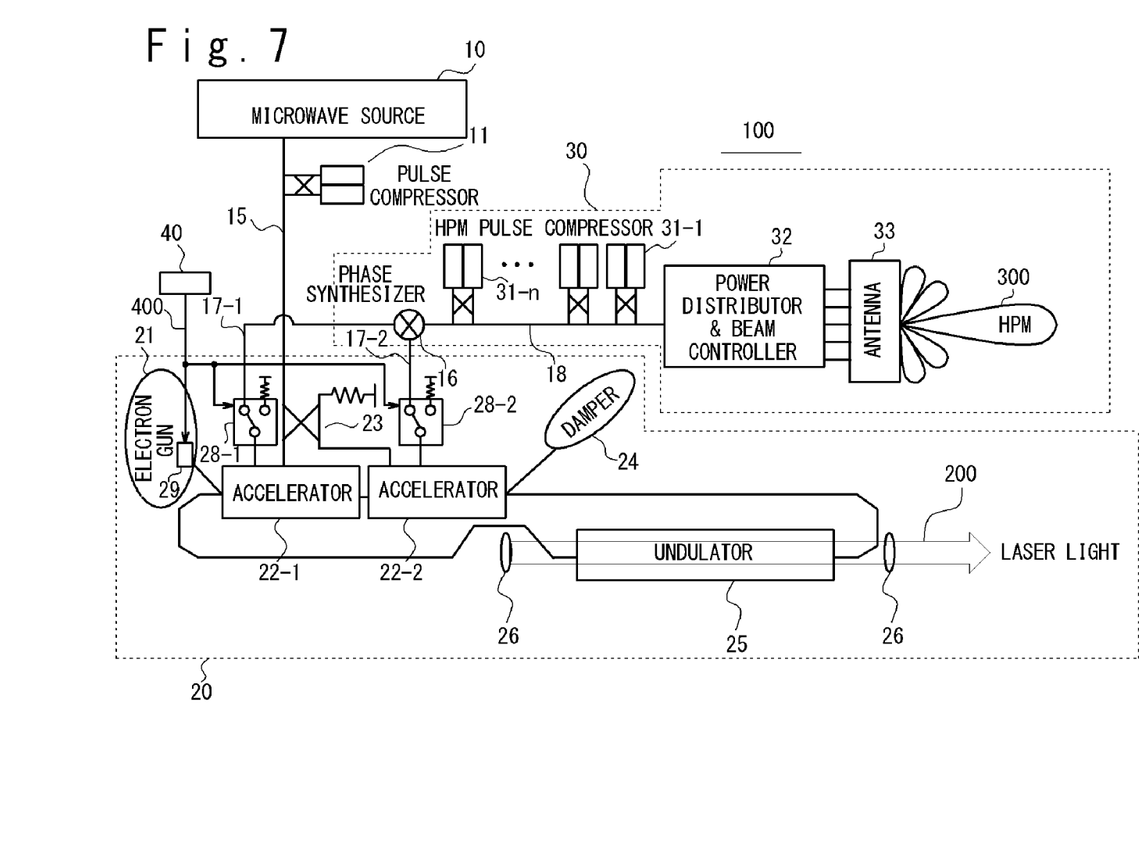
FIG. 7 is a diagram showing another configuration example of the directed-energy irradiating apparatus according to the second embodiment of the present invention.

With the above configuration, the directed-energy irradiating apparatus 100 according to the present invention can irradiate the FEL beam 200 by using the microwave (RF power) supplied from the microwave source 10 and also irradiate the HPM beam 300 by using the excessive RF power in the FEL apparatus 20. The FEL beam 200 and the HPM beam 300 may be outputted at the same time or may be irradiated at the timings differing from each other. For example, as shown in FIG. 7, the accelerators 22 (22-1 and 22-2) and the waveguides 17-1 and 17-2 and switches 28 (28-1 and 28-2), and dummy loads are provided. Each of the switches 28 is connected to a corresponding one of the accelerators 22 and selects one of the dummy load and a corresponding one of the waveguides 17 in response to the switch control signal from the switch controller 40. When the waveguide 17 is selected, the excessive RF power is supplied to the waveguide 17, so that the HPM beam 300 is irradiated, and when the dummy load is selected, the excessive RF power is consumed by the dummy load. Or, if a switch (not shown) for controlling the transmission of the microwave is provided between the phase synthesizer 16 and the waveguide 18, it is possible to control whether or not the HPM beam 300 is to be irradiated. Also, as shown in FIG. 7, by providing a control unit 29 for stopping (controlling) the supply of the free electrons from the electron gun 21, it is possible to stop (control) the irradiation of the FEL beam 200. In this case, the switch for controlling the irradiation of the HPM beam 300 and the control unit 29 for controlling the irradiation of the FEL beam 200 are desirable to be controlled in accordance with the algorithm similar to the switch controller 40 shown in the first embodiment. In case of an example shown in FIG. 7, the switches 28-1 and 28-2 and the control unit 29 are controlled on the basis of the switch control signal 400 outputted by the switch controller 40. Also, a configuration in which only one of the switches 28-1 and 28-2 and the control apparatus 29 is installed may be used although this configuration is not shown. In this case, the irradiation of only one of the FEL beam 200 and the HPM beam 300 and the simultaneous irradiation are switched.

According to the directed-energy irradiating apparatus 100 in the second embodiment, each of the FEL apparatus 20 and the HPM apparatus 30 is singly used. Also, they can be used at the same time. Thus, independent of the environment, the handling performance (target destruction performance) is improved. Also, the microwave source 10 that serves as a main configuration element in the size and the electric power consumption is shared, which allows the FEL apparatus 20 and the HPM apparatus 30 to be used without any great change in the system size. Moreover, the HPM beam 300 irradiated from the HPM apparatus 30 includes the harmonics generated as the excessive RF power in the accelerator 22. Therefore, the spectral of the HPM beam 300 is spread (the wide frequency components are included), which make it possible to avoid a defense means against a particular frequency. That is, according to the HPM apparatus 30 in this embodiment, the destruction performance by the HPM beam 300 is improved as compared with an example of directly using the RF power from the microwave source 10.

[Third Embodiment]

Figure 6:
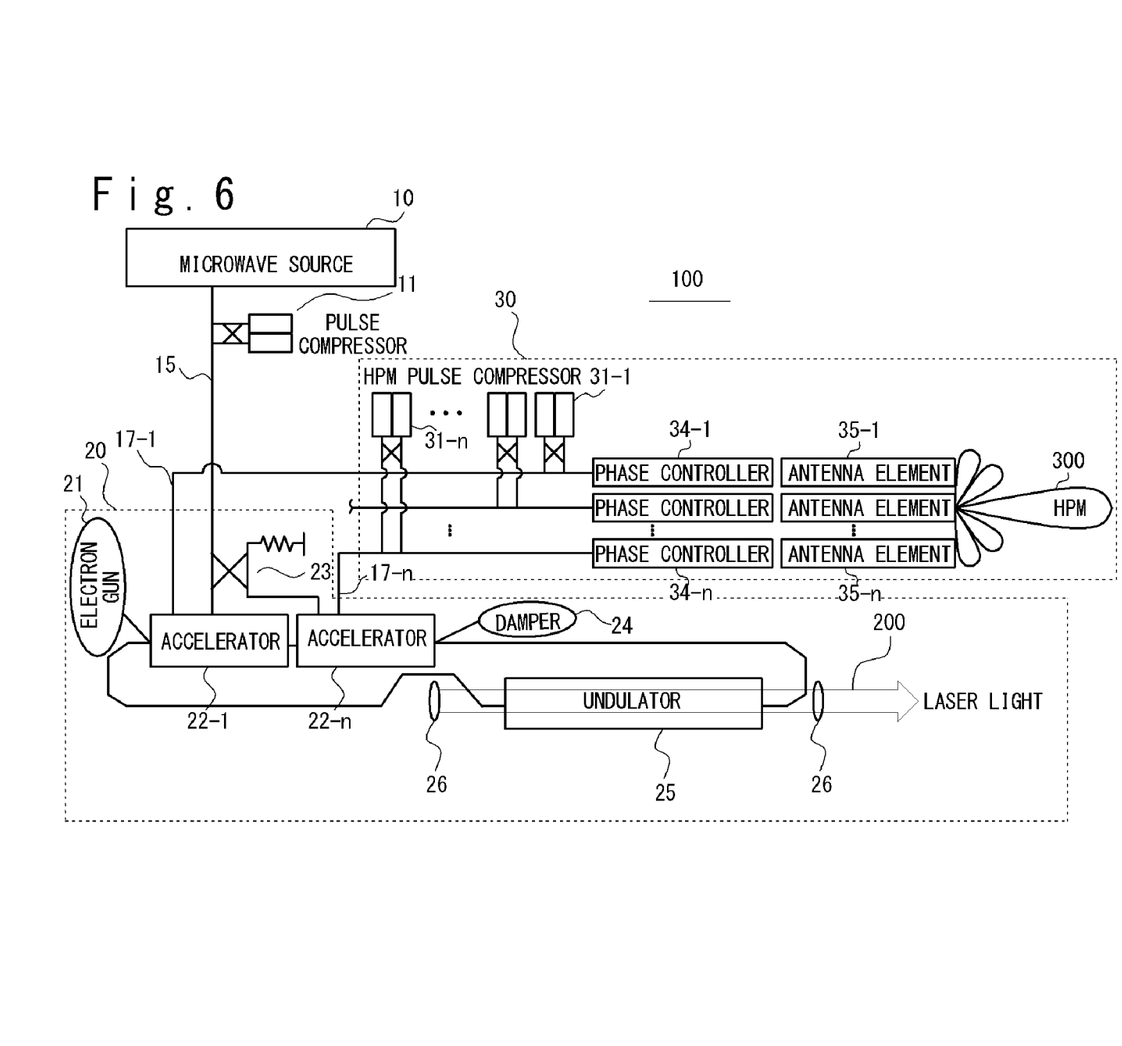
FIG. 6 is a diagram showing a configuration example of the directed-energy irradiating apparatus according to a third embodiment of the present invention.

With reference to FIG. 6, the directed-energy irradiating apparatus 100 according to a third embodiment of the present invention will be described. The directed-energy irradiating apparatus 100 in the third embodiment outputs the HPM beam 300 by using the excessive RF power that is generated when the FEL beam 200 is irradiated. The directed-energy irradiating apparatus 100 in the third embodiment irradiates the HPM beam 300 from the array antenna by individually controlling the phases without synthesizing the phases of the respective excessive RF powers supplied from the plurality of accelerators. Consequently, similarly to the second embodiment, the common microwave source 10 can be used to irradiate the FEL beam 200 and the HPM beam 300 simultaneously or individually. Also, even under the situation in which the destruction effect by the laser beam cannot be expected, the targets can be destroyed. Moreover, the electric power that is supplied to sets of the waveguides 17 (17-1, . . . , 17-$n$), pulse compressors 31 (31-1, . . . , 31-$n$), phase controllers 34 (34-1, . . . , 34-$n$) and antenna elements 35 (35-1, . . . , 35-$n$) can be reduced. The directed-energy irradiating apparatus 100 in the third embodiment will be described below in detail.

FIG. 6 is a diagram showing a configuration example of the directed-energy irradiating apparatus 100 according to the third embodiment of the present invention. With reference to FIG. 6, the directed-energy irradiating apparatus 100 in the third embodiment contains the microwave source 10, the pulse compressor 11, the waveguides 15, 17 (17-1 to 17-$n$), the FEL apparatus 20 and the HPM apparatus 30.

The microwave source 10 is exemplified by a klystron and outputs the microwave (RF power) of the predetermined frequency band (for example, several GHz). The microwave (RF power) is outputted from the microwave source 10, is pulse-compressed by the pulse compressor 11, and is supplied through the waveguide 15 to the FEL apparatus 20. The number of the microwave sources 10 can be arbitrarily set. Thus, the number may be one or plural.

The FEL apparatus 20 contains waveguides 17 (17-1 to 17-$n$), the coupler 23, the electron gun 21, the plurality of accelerators 22 (22-1 to 22-$n$), the damper 24, the undulator 25 and the reflection mirrors 26. The microwave (RF power) is supplied from the microwave source 10 through the waveguide 15 and is supplied through the coupler 23 to each of the accelerators 22-1 and 22-$n$. The free electrons generated by the electron gun 21 are accelerated by the accelerators 22-1 and 22-n to a speed close to the light speed, and each accelerator is exemplified as a disc loaded accelerator. When the free electrons are passed through the undulator 25, the radiation light is generated. The radiation light generated by the undulator 25 is travels back and forth between the reflection mirrors 26 to improve the coherency. The radiation light is outputted as the FEL beam 200 with the wavelength (for example, IR band) which depends on the energy of the free electrons and the undulator period. In this embodiment, the excessive RF powers are not used to accelerate the free electrons, and are supplied to phase controllers 34-1 to 34-n through the waveguides 17-1 to 17-n, and not the dummy loads. For example, when the microwave of several gigawatts is supplied from the microwave source 10, the excessive RF powers of several megawatts that has the harmonics of frequencies equal to integer times that of the basic wave is generated in addition to the basic wave of the same frequency as the microwave. Since the configuration of the accelerator 22 is similar to the second embodiment, its description is omitted. It should be noted that when a plurality of microwave sources 11 are installed, a plurality of couplers 23, accelerators 22 and waveguides 15 are naturally installed.

The HPM apparatus 30 contains the pulse compressors 31-1 to 31-n connected to the corresponding waveguides 17-1 and 17-n, the phase controllers 34-1 to 34-n and the antenna elements 35-1 to 35-n. The microwaves (excessive RF powers) supplied to the waveguides 17-1 to 17-n are compressed by the HPM pulse compressors 31-1 to 31-n, and supplied to the phase controllers 34-1 to 34-n, respectively. The phase controllers 34-1 to 34-n control the phases and amplitudes of the supplied microwaves to control its directional characteristics (a weighting process), and output to the antenna elements 35-1 to 35-n. Each of the antenna elements 35-1 to 35-n functions as an active phased array antenna of outputting the HPM beam 300 whose phase is controlled. Also, the numbers of the HPM pulse compressors 31, the phase controllers 34 and the antenna elements 35 are not always identical. For example, a phase distributor (that is not shown) may be installed between the HPM pulse compressor 31 and the phase controller 34.

Figure 8:
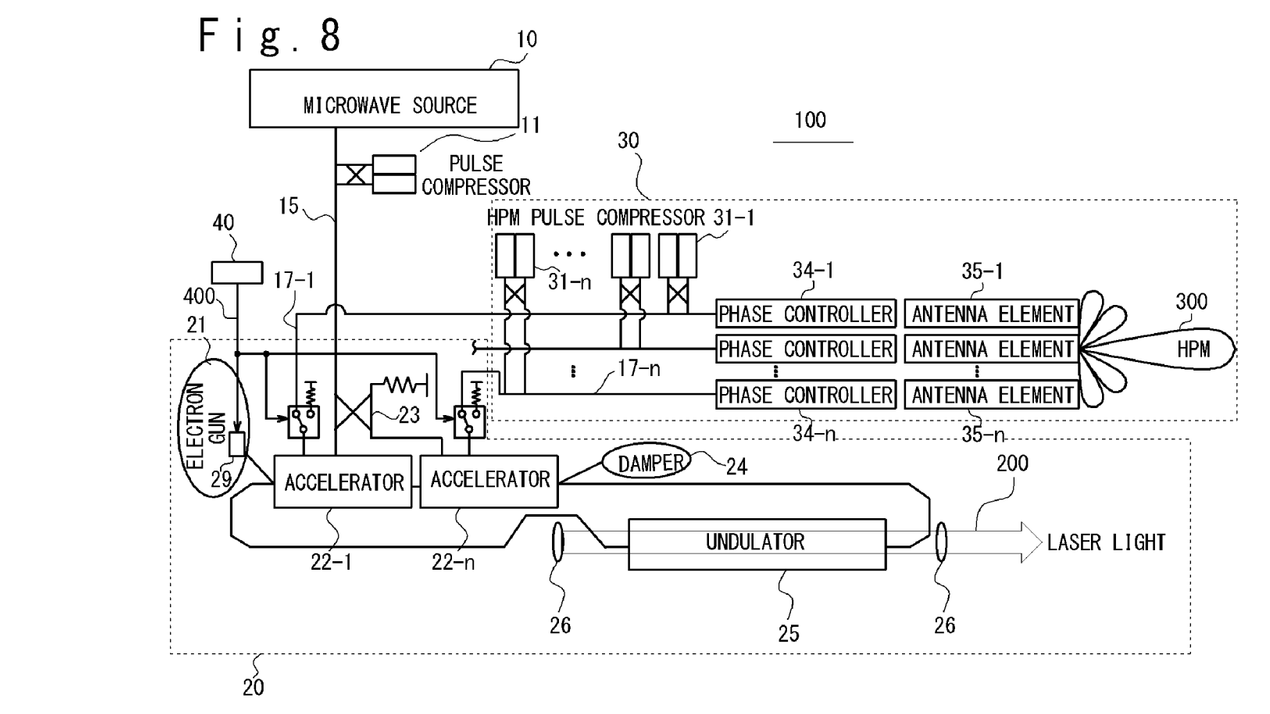
FIG. 8 is a diagram showing another configuration example of the directed-energy irradiating apparatus according to the third embodiment of the present invention.

With the above configuration, the directed-energy irradiating apparatus 100 according to the present invention can irradiate the FEL beam 200 by using the microwave (RF power) supplied from the microwave source 10 and also irradiate the HPM beam 300 by using the excessive RF power in the FEL apparatus 20. The FEL beam 200 and the HPM beam 300 may be outputted at the same time or may be irradiated at the timings differing from each other. For example, as shown in FIG. 7, by providing the accelerators 22-1 and 22-2 and the waveguides 17-1 and 17-2 and the switches 28-1 and 28-n, it is possible to control whether or not the HPM beam 300 is irradiated. Or, by providing the switch (not shown) for controlling the transmission of the microwave on the waveguide 18, it is possible to control whether or not the HPM beam 300 is irradiated. Also, as shown in FIG. 8, by installing the control unit 29 for stopping (controlling) the supply of the electrons from the electron gun 21, it is possible to stop (control) the irradiation of the FEL beam 200. In this case, the switch for controlling the irradiation of the HPM beam 300 and the control unit for controlling the irradiation of the FEL beam 200 are desirable to be controlled in accordance with the algorithm similar to the switch controller 40 shown in the first embodiment. In case of configuration example shown in FIG. 8, the switches 28-1 and 28-n and the control unit 29 are controlled on the basis of the switch control signal 400 outputted by the switch controller 40. Also, the configuration in which only one of the switches 28-1 and 28-2 and the control apparatus 29 is installed may be used although this configuration is not shown. In this case, the irradiation of only one of the FEL beam 200 and the HPM beam 300 and the simultaneous irradiation are switched.

According to the directed-energy irradiating apparatus 100 in the third embodiment, each of the FEL apparatus 20 and the HPM apparatus 30 may be used singly or simultaneously. Thus, independent of the environment, the handling performance (target destruction performance) is improved. Also, the microwave source 10 as a main component with regard to the size and the electric power consumption is shared, so that the FEL apparatus 20 and the HPM apparatus 30 can be used without any great change in the system size. Moreover, the HPM beam 300 irradiated from the HPM apparatus 30 includes the harmonics generated as the excessive RF power in the accelerator 22. Therefore, the spectral of the HPM beam is spread (the wide frequency components are included), so that a defensive means against a particular frequency can be invalidated. That is, according to the HPM apparatus 30 in this embodiment, the destruction performance by the HPM beam 300 is improved as compared with an example of directly using the RF power from the microwave source 10. Also, in this embodiment, by using the HPM beam 300 whose phase is shifted, the HPM beam 300 can be irradiated into an optional direction in a short time. Moreover, the electric power consumed in the pulse compressors 31-1 to 31-n, the phase controllers 34-1 to 34-n and the antenna elements 35-1 to 35-n is low as compared with the first and second embodiments. Thus, this is advantageous even from the aspect of electric power durability and thermal durability.

As mentioned above, the embodiments of the present invention have been described in detail. However, the specific configurations are not limited to the above-mentioned embodiments. Any modifications made without departing from the scope and spirit of the present invention are included in the present invention. The first to third embodiments may be combined and applied in a range without any technical conflict.

What is claimed is:
1. A directed-energy irradiating apparatus comprising:
a microwave source;
a free electron laser (FEL) apparatus configured to receive a microwave from said microwave source, accelerate free electrons by using the microwave to irradiate a free electron laser (FEL) beam, generated by using the accelerated free electrons, to a target to be destroyed, and output a remainder of the microwave; and
a high power microwave (HPM) apparatus configured to irradiate a high power microwave (HPM) beam, generated by using the remainder of the microwave outputted from said FEL apparatus, to the target,
wherein said FEL apparatus is connected to said microwave source through a first waveguide,
wherein said HPM apparatus is connected to said FEL apparatus through a second waveguide,
wherein said FEL apparatus is configured to receive the microwave through the first waveguide, and
wherein said FEL apparatus is configured to output the remainder of the microwave to said HPM apparatus though the second waveguide.
2. The directed-energy irradiating apparatus according to claim 1,
wherein said FEL apparatus comprises a plurality of accelerators configured to receive parts of the microwave supplied from said microwave source, respectively, and wherein said HPM apparatus comprises a phase synthesizer configured to synthesize phases of remainders of the microwave parts outputted from said plurality of accelerators as the remainder of the microwave to produce a phase-synthesized microwave, such that the HPM beam is irradiated to the target by using the phase-synthesized microwave.

3. The directed-energy irradiating apparatus according to claim 2, wherein said HPM apparatus further comprises a pulse compressor configured to pulse-compress the phase-synthesized microwave such that the HPM beam is irradiated to the target by using the pulse-compressed microwave.

4. The directed-energy irradiating apparatus according to claim 1,
wherein said FEL apparatus comprises a plurality of accelerators configured to receive parts of the microwave supplied from said microwave source, respectively, and
wherein said HPM apparatus comprises phase controllers configured to control phases of remainders of the microwave parts outputted from said plurality of accelerators as the remainder of the microwave to produce phase-controlled microwave parts, respectively, such that the HPM beam is irradiated by using the phase-controlled microwave parts.

5. The directed-energy irradiating apparatus according to claim 4, wherein said HPM apparatus further comprises a pulse compressor provided with one of said phase controllers to pulse-compress a corresponding one of the remainders of the microwave parts to output to a corresponding one of said phase controllers.

6. The directed-energy irradiating apparatus according to claim 4, wherein said HPM apparatus further comprises antenna elements provided with said phase controllers to irradiate the HPM beam by using the phase-controlled microwave parts.

7. The directed-energy irradiating apparatus according to claim 1, further comprising a controller configured to select at least one of the FEL beam and the HPM beam to be irradiated to the target based on external environmental data.

8. The directed-energy irradiating apparatus according to claim 7, wherein the external environmental data comprises at least one of weather data, geographic data, and status data of the target.

9. The directed-energy irradiating apparatus according to claim 8, wherein the status data of the target comprises data indicating a platform type or specific type of the target.

10. The directed-energy irradiating apparatus according to claim 8, wherein the status data of the target comprises data indicating a beam spread on the target during irradiation of the FEL beam.

11. The directed-energy irradiating apparatus according to claim 8,
wherein the status data of the target comprises data indicating a temperature change of the target before and after irradiation of the FEL beam, and
wherein said controller is configured to select the HPM beam, when the temperature change is equal to or less than a predetermined value.

12. The directed-energy irradiating apparatus according to claim 8,
wherein the status data of the target comprises data indicating a speed of the target, and
wherein said controller is configured to select the HPM beam, when the speed is greater than a predetermined value.

13. The directed-energy irradiating apparatus according to claim 8,
wherein the status data of the target comprises data indicating a number of targets, and
wherein said controller is configured to select the HPM beam, when the number of targets is more than a predetermined value.

14. The directed-energy irradiating apparatus according to claim 8,
wherein the status data of the target comprises data indicating a relative speed to the target, and
wherein said controller is configured to select one of the FEL beam and the HPM beam, when the relative speed to the target during irradiation of another of the FEL beam and the HPM beam is equal to or greater than a predetermined value.

15. The directed-energy irradiating apparatus according to claim 8,
wherein the status data of the target comprises data indicating relative positions of a number of targets or the number of targets, and
wherein said controller is configured to select one of the FEL beam and the HPM beam, when the number of targets after irradiation of another of the FEL beam and the HPM beam is equal to or greater than a predetermined value, or when the targets are distributed in an area wider than a predetermined area.

16. The directed-energy irradiating apparatus according to claim 8,
wherein the status data of the target comprises data indicating a deceptive material around the target, and
wherein said controller is configured to select one of the FEL beam and the HPM beam based on a kind of the deceptive material of the target.

17. The directed-energy irradiating apparatus according to claim 7,
wherein the external environmental data comprises engagement status of the target, and
wherein said controller is configured to select one of the FEL beam and the HPM beam based on the engagement status of the target after irradiation of the FEL beam or the HPM beam.

18. The directed-energy irradiating apparatus according to claim 1, further comprising a controller configured to select at least one of the FEL beam and the HPM beam to be irradiated to the target based on external environmental data,
wherein said controller is configured to select one of the FEL beam and the HPM beam in response to command data supplied through an interface in priority to the external environmental data.

19. The directed-energy irradiating apparatus according to claim 1, further comprising a controller configured to select at least one of the FEL beam and the HPM beam to be irradiated to the target based on external environmental data,
wherein said controller is configured to select one of the FEL beam and the HPM beam based on an operation situation of said FEL apparatus or said HPM apparatus, in priority to the external environmental data.

* * * * *